United States Patent [19]
Dray

[11] Patent Number: 5,258,158
[45] Date of Patent: * Nov. 2, 1993

[54] POSITIVE-TYPE NON-RETURN VALVE AND METHOD OF USING VALVE

[76] Inventor: Robert F. Dray, Rt. 1, Box 273M, Hamilton, Tex. 76531

[*] Notice: The portion of the term of this patent subsequent to Sep. 29, 2009 has been disclaimed.

[21] Appl. No.: 805,019

[22] Filed: Dec. 11, 1991

Related U.S. Application Data

[63] Continuation-in-part of Ser. No. 699,277, May 13, 1991, Pat. No. 5,151,282.

[51] Int. Cl.$^5$ .............................................. B29C 45/20
[52] U.S. Cl. ................................. 264/328.1; 425/563; 425/564
[58] Field of Search ............... 425/207, 208, 559, 561, 425/562, 563, 564, 587, 586; 264/328.1, 328.8, 328.9, 328.11

[56] References Cited

U.S. PATENT DOCUMENTS

| | | |
|---|---|---|
| 3,438,393 | 4/1969 | Godley, II . |
| 3,590,439 | 7/1971 | Swanson ........................ 137/533.17 |
| 4,062,479 | 12/1977 | Szabo ............................ 137/533.27 |
| 4,105,147 | 8/1978 | Stubbe ........................... 137/533.17 |
| 4,512,733 | 4/1985 | Eichlseder et al. . |
| 4,643,665 | 2/1987 | Zeiger . |
| 5,044,926 | 9/1991 | Dinerman et al. ................. 425/562 |
| 5,112,212 | 5/1992 | Akselrud et al. ................. 425/557 |
| 5,143,733 | 9/1992 | Von Buren et al. .............. 425/130 |
| 5,151,282 | 2/1992 | Dray ................................. 425/563 |

FOREIGN PATENT DOCUMENTS 866929 5/1961 United Kingdom ............... 425/562

*Primary Examiner*—Jill L. Heitbrink
*Attorney, Agent, or Firm*—Hubbard, Thurman, Tucker & Harris

[57] ABSTRACT

A positive-type, non-return valve (10) primarily for use with an injection molding machine utilizes a frame (12) which surrounds a first bore (34) and a second bore (32). The second bore (32) is accessed by inlets (30). Outlet passages (40) are located downstream of said inlet (30) and connect second bore (32) with an accumulation area (6). A piston (60) is dimensioned to slidably fit within the first bore (34) and extend into the second bore (32). In a downstream position, the piston (60) allows positive flow of material from the inlet (30) to the outlet (40). In an upstream position, the piston (60) positively blocks flow of material from the inlet (30) to the outlet (40). The piston (60) can be forced to its upstream position at the beginning of the injection step or can be preclosed by maintaining back pressure on the screw (2) prior to injection.

36 Claims, 3 Drawing Sheets

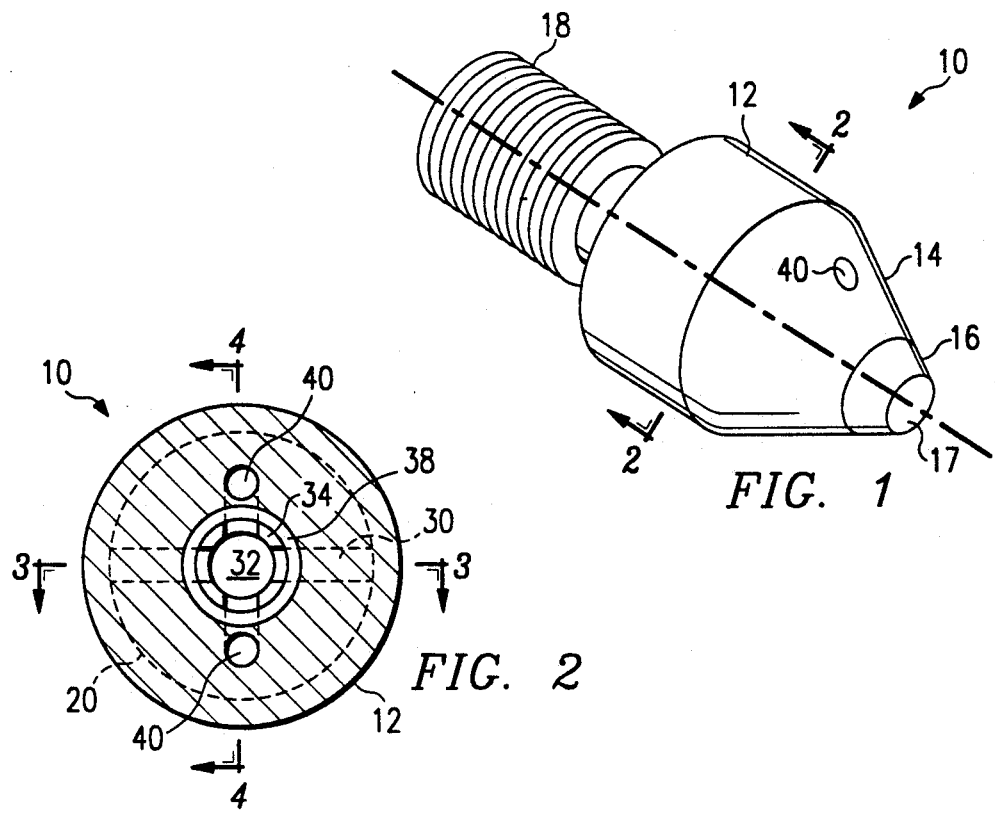
FIG. 1
FIG. 2
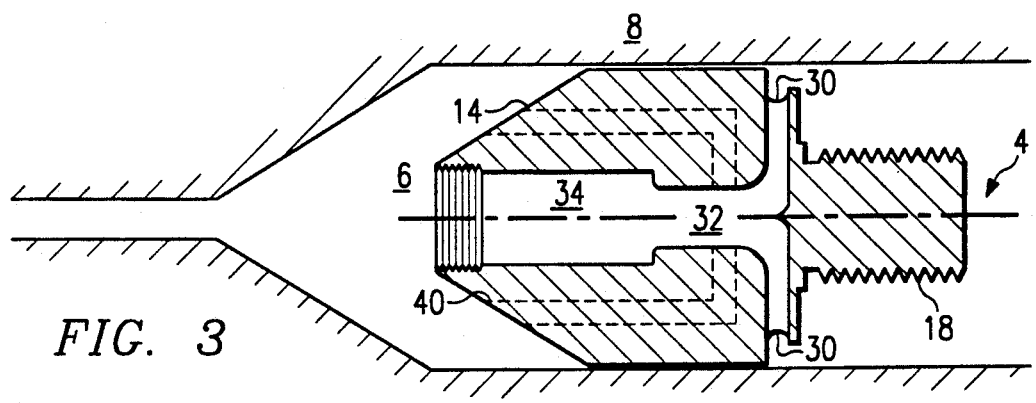
FIG. 3
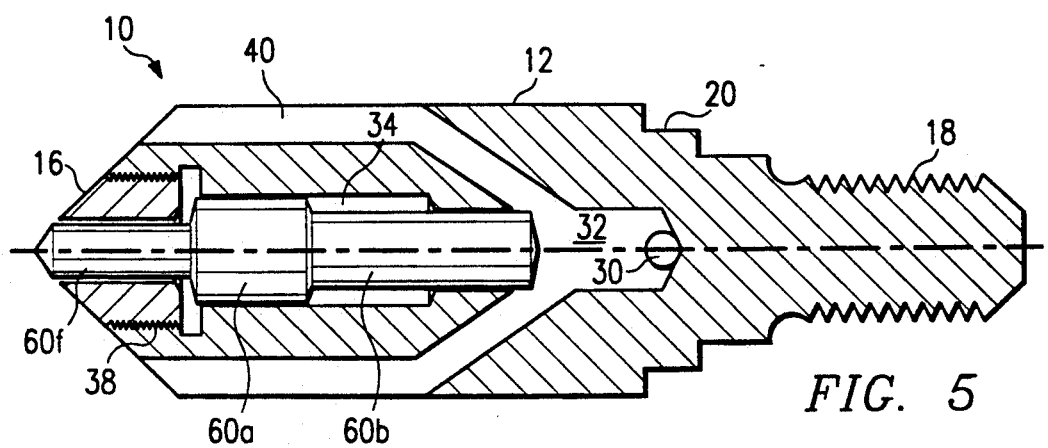
FIG. 5

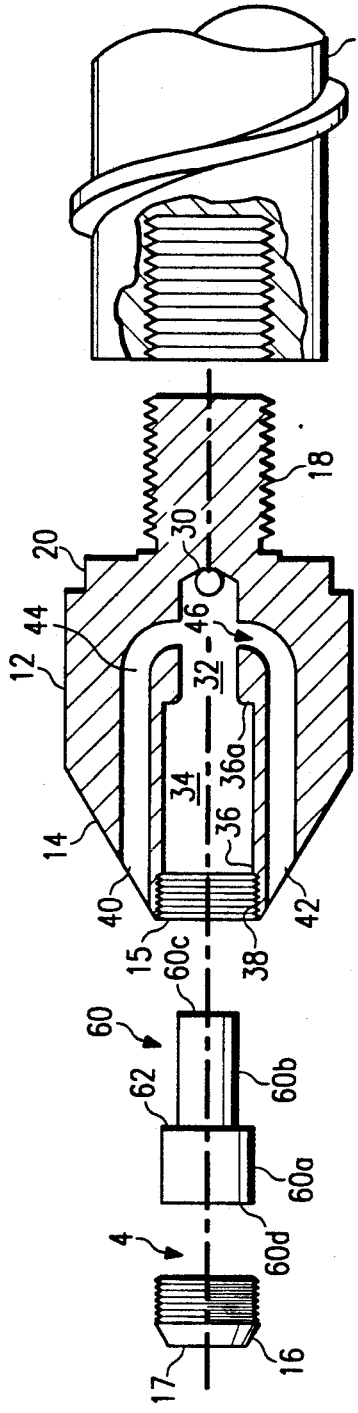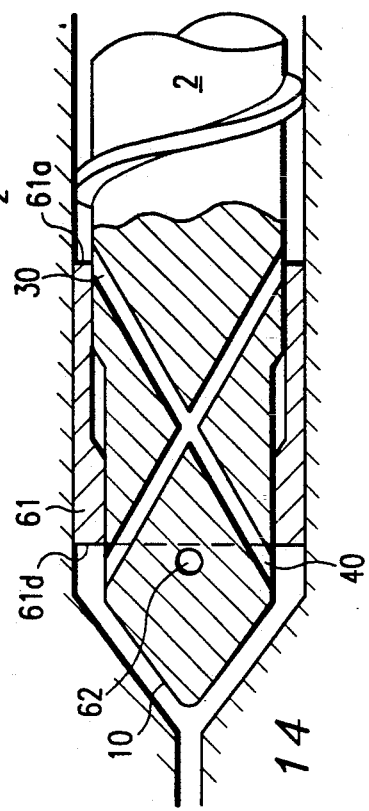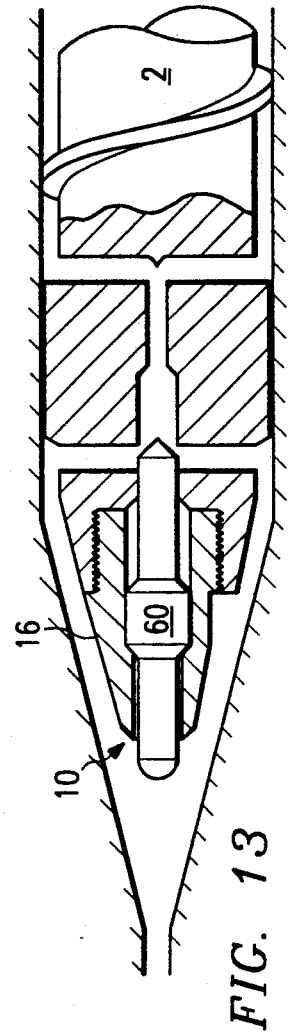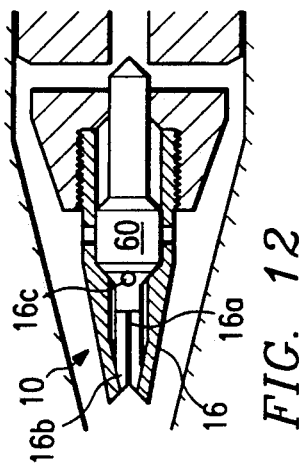

POSITIVE-TYPE NON-RETURN VALVE AND METHOD OF USING VALVE

The present application is a continuation-in-part of co-pending application Ser. No. 07/699,277, filed on May 13, 1991, now U.S. Pat. No. 5,151,282 issued Sep. 29, 1992, and also entitled "Positive-Type Non-return Valve".

TECHNICAL FIELD OF THE INVENTION

The present invention relates to a positive-type non-return valve. In particular, the valve is used to positively stop the reverse flow of material therethrough in a more consistent and repeatable manner than valves of common usage.

BACKGROUND OF THE INVENTION

Injection molding is one of the dominant forms of manufacture of plastic articles in the world today. However, a problem with uniformity of product plagues this process of injecting a quantity, or shot, of melted plastic into a mold. Uniformity is sacrificed due to the inability to perfectly control the quantity of material injected into the mold. This imperfection is due primarily to failure of a non-return valve, found on most injection molding machines, to close in a consistent, repeatable manner and then properly seal against back flow of material during the injection step.

A review of the prior art illustrates two primary methods of sealing against this back flow of material during the injection step: a ring-type shut off valve or a ball-type check valve. With either method, as the injection ram strokes forward, a ball or piston is forced against a seat or a tapered ring is forced against another ring with a complementary taper. There are various alterations on these devices that either control the length of the stroke or the shape of the valve parts and the plastic flow passages. However, in either case, plastic leakage flow over the ball or piston, or under the ring, creates a pressure drop across this moving member of the valve. This pressure drop becomes the primary force to close the valve. Any variation in the leakage flow before the valve closes results in a variation in the quantity of plastic trapped in front of the closed valve. Leakage flow variations occur with these valves resulting in product variations of major or minor significance depending on the product being made, operating conditions, and plastic material characteristics.

The sealing surfaces in either a ring-type or ball-type valve can become contaminated with particles which prevent a perfect seal. This allows for material migration back through the valve rather than forward into the mold. Variations in this lost quantity of material will cause an imperfect product from the mold which may be unacceptable for its intended use. Detection of these unacceptable products requires significant inspection costs or inconvenience for the ultimate user of the product. To improve quality, many manufacturers have implemented statistical process control (SPC) which attempts to define and control process variables so that all supplied product is sufficiently identical, eliminating the need for inspection.

Therefore, a need exists for a non-return valve which never fails to furnish the same shot size regardless of plastic, fillers, contamination, product produced, or wear. This valve should be designed to allow its incorporation into existing injection molding machines or any other device which utilizes a non-return valve. This valve should not be dependent on leakage through the valve to generate the force necessary to move the valve to its closed position. Furthermore, this valve should be designed so that the seal can never be impaired by particles. Thus, each time the valve seals, the sealing action should shear and clear away any such particles.

SUMMARY OF THE INVENTION

The present invention relates to a positive-type non-return valve. The valve is designed for use in an injection molding device with a screw type injection plunger but may be used in any application requiring one-way flow of a liquid material. In its simplest form, the valve is comprised of a frame surrounding a primary chamber. The primary chamber is comprised of a first bore and a second bore. The frame is generally cylindrical and typically has a tapered, conical downstream end. The proximal end can be threaded to allow for connection to a screw located in a barrel; however, the valve could also be an integral part of the screw. The outer diameter of the valve must closely approximate the inner diameter of this barrel. The first bore can extend to an axially-centered opening in the distal end of the valve. Because material is flowing through the valve, its proximal end is also referred to as upstream and its distal end is also referred to as downstream.

The second bore is accessed by at least one inlet port. This inlet port leads from the screw's material flow path to the second bore which is upstream of and connected to the first bore. Both of the first and second bores are cylindrical and typically concentric; with the diameter of the second bore less than that of the first bore. At least one outlet passage leads from this second bore to at least one port located on the downstream end of the valve. The upstream end of said outlet passage is located downstream from the downstream end of the inlet port.

A piston is dimensioned to fit inside the first bore and to extend into the second bore. The piston has a main body dimensioned to slidably engage the first bore, and a downstream portion body which slidably engages the second bore. The downstream travel of the piston is limited by a retainer such as a flow-through cap removably attached to the downstream end of the valve. The upstream travel of the piston is limited by a stop means, typically a ridge formed where the diameter of the first bore reduces at its intersection with the second bore. The reduced diameter portion of the piston is dimensioned to block the upstream opening to the outlet passage when said piston is in an upstream position, and to uncover said opening when in a downstream position.

Material, typically melted plastic, is fed into the inlets by the screw. This material floods the second bore and forces the piston towards its downstream position opening the outlet passages. The opening will be only partial to obtain equal forces on opposite ends of the piston. A pressure drop must occur across this partial opening so that the distal end area of the piston times its pressure equals the proximal end area times its pressure. The material then proceeds into the outlet passages, out of the valve and into an accumulation area. When this area has collected a selected amount of plastic, the screw stops rotating and typically the back pressure, used to assist the screw in melting plastic, is reduced to zero. Pullback is then frequently used to assure zero pressure in the accumulated plastic (to avoid leakage into the mold when the previously produced part is removed)

and to improve the repeatability performance of ring or ball-check valves. After the previously produced part has cooled sufficiently, the mold is opened, the part is removed, and the mold is again closed. The screw ram then moves forward in the barrel producing pressure in the accumulation area to fill the mold. This pressure also tends to push material back into the outlet passage and back through the inlet However, the pressure also pushes the piston to its rearward closed position which blocks the flow of material from the outlet to the inlet.

Closing action is caused by pressure alone. No undesired leakage flow across the valve, as required in slider ring and ball check valves, is required to accomplish the closing action. The piston will encounter pressure against its reduced diameter upstream surface equal to the pressure against its downstream face. However, the force against its downstream face is greater and will overcome the force on its upstream face due to the differences in their respective surface areas. Thus, the piston will close quickly and repeatably at the start of the injection step. The minimal partial opening of the valve described above assists in the quickness and repeatability of its action. The piston will also deter clogging and leakage after closure because it will tend to shear away any contaminants in its way.

Since valve closing results from only pressure in the accumulation area without a source of overpowering pressure (typically screw rotation) on the proximal end of the piston, the valve can be preclosed before injection. A spring such as that shown in the Eichlseder U.S. Pat. No. 4,512,733 is not required. The valve is designed to have no material flow around and over the movable member valve.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 1 is an isometric view of the positive-type, non-return valve;

FIG. 2 is a sectional view across line 2—2 in FIG. 1;

FIG. 3 is a longitudinal sectional view across line 3—3 in FIG. 2 without the piston and retainer;

FIG. 4 is a longitudinal sectional view across line 4—4 in FIG. 2 with the piston and retainer disassembled;

FIG. 5 is a longitudinal sectional view of a preferred embodiment of the non-return valve;

FIGS. 11 and 12 illustrate alternative embodiments of the non-return valve;

FIG. 13 illustrates a stream-lined version of the non-return valve; and

FIG. 14 illustrates an inverted version of the non-return valve with a ring replacing the piston.

DETAILED DESCRIPTION

Figure 6:
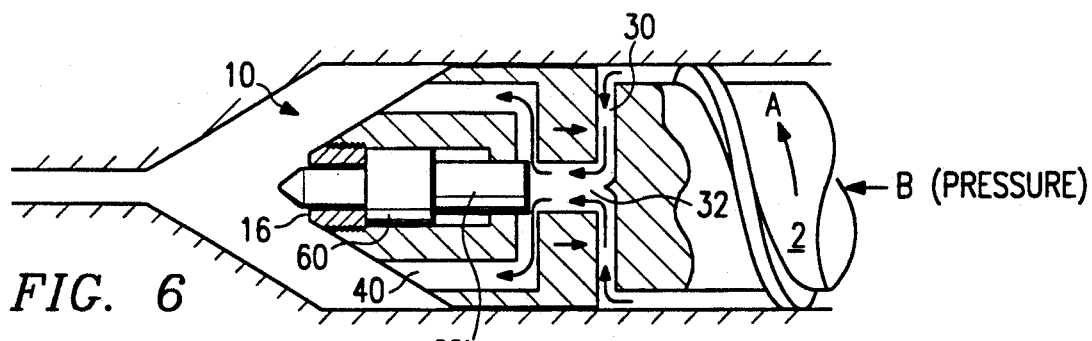
FIGS. 6 to 10 illustrate the various steps in a method of injection molding utilizing the present non-return valve.

The present invention relates to a positive-type non-return valve that overcomes many of the disadvantages found in the prior art. Referring to FIG. 1, a positive-type non-return valve embodying the present invention is disclosed. Valve 10 is typically made of steel and used as part of an injection molding machine unit having a barrel, with an injection nozzle on one end of the barrel and a screw movable in the barrel. The valve 10 allows material to pass therethrough when screw is rotating but closes when the screw translated forward with no screw rotation. All dimensions provided below are for a valve 10 attached to a two and one-half (2½") inch feed screw. Other dimensions may be used to suit the situation.

Referring to FIGURES 1 to 5 simultaneously, valve 10 comprises a generally cylindrical frame 12 with an inclined or tapered surface 14 on the downstream end and an attachment surface 18 on the upstream end. A cap 16 or other retaining means with a flow through central passage 17 is attached to frame 12, typically by annular threads. A piston 60 is located in a first bore 34 and second bore 32 of frame 12. The non-return valve 10 is attached to or is a part of screw 2, as shown in FIG. 4, both of which are located in a barrel 8, shown in FIG. 3, with an accumulation area 6, shown in FIG. 3, located downstream of said valve 10. Both the screw 2 and valve 10 slidably fit within said barrel. Material is fed by the rotating screw 2 into inlet 30. As discussed, frame 12 contains a centrally located primary chamber comprising a first bore 34 and a second bore 32 which are accessed by several channels or passages. Inlets 30, located on ridge 20 lead to the second bore 32, best seen in FIG. 3, which is typically coaxial with the barrel, screw and valve 10. Inlets 30 can be oppositely located on ridge 20 and radially extend to the axis 4 of frame 12. The inlets are typically about one-quarter (¼) to three-eighths (⅜) inch in diameter The second bore 32 extends from the inlets 30 to the first bore 34. The second bore 32 is preferably several inches long, as space permits, and approximately one half (½) inch in diameter.

FIG. 2 is a sectional view of valve 12 showing a typical relationship of inlet 30, outlet 40, first bore 34, and second bore 32. Although two inlets and two outlets are preferred, valve 10 would only require at least one of each. The first bore 34 is usually coaxially located in the frame 12 immediately downstream of the second bore 32. The first bore 34 extends to the front opening 15 of the frame 12. The first bore 34 is defined by wall 36 and ridge 36a. The wall 36 immediately adjacent to the front opening 15 is typically threaded as at 38. The first bore 34 is preferably about two (2) inches long and three-quarters (¾) inches in diameter.

The downstream ends of outlets 40, best shown in FIG. 4, are located on the inclined surface 14 of frame 12. Outlets 40 can be positioned one hundred and eighty (180) degrees apart and are typically one-quarter (¼) inch in diameter. The upstream end of outlets 40 is initiated in the second bore 32. The outlet 40 may take any path from the second bore 32 to surface 14, but is preferably a smooth path without any sharp angles involved.

The piston 60 is dimensioned to fit closely but slidably inside first bore 34 and second bore 32. The piston 60 has a stepped outer surface creating at least two portions 60a, 60b. Piston portion 60a has a diameter slightly less than three-quarters (¾) of an inch and a length of approximately three-quarters (¾) of an inch. The piston portion 60b has a diameter of slightly less than one-half (½) inch and a length of approximately one and one-half (1½) inch. Thus, there is at most a clearance of a few thousandths of an inch between piston portion 60a and wall of first bore 34, and between piston portion 60b and second bore 32. The travel of piston 60 is limited by cap 16 at one end and by flange surface 36a at the other end. When in a forward position against cap 16, plastic may flow from inlet 30 into entrance 46 and through outlet 40. In a closed position, piston portion 60*b* blocks entrance 46 between inlet 30 and passage 44.

FIG. 5 illustrates a preferred embodiment of the non-return valve 10. This embodiment differs from those previously described in two respects. First, the outlets 40 are initially angled off of the second bore 32. The downstream exits of outlets 40 are located near the periphery of the downstream face of valve 10. Second, the piston 60 includes a third portion 60*f* extending downstream from the main piston body 60*a*. This third portion 60*f* extends through the flow-through portion of cap 16, forming a more flow dynamic downstream surface.

FIGS. 6 through 10 illustrate the various steps in a method of injection molding utilizing the present non-return valve 10. Two methods of injection are disclosed. The first method involves the steps of recovery, pullback, and injection. The second method involves the steps of recovery, preclosure, pullback after preclosure and injection. FIG. 6 illustrates the "recovery" step which occurs after a shot has been injected and the accumulation area is empty. The valve is open, allowing recovery of a new shot of material. The screw 2 and valve 10 are shown in a retracted position relative to the barrel 8. The screw 2 is rotating and plastic is flowing as indicated by the arrow A and feeding material through the inlets 30. Material next passes into the second bore 32 and encounters piston 60. The pressure exerted by the material due to the screw rotation pushes the piston to its downstream position within the valve 10. The material begins to fill accumulation area 6. As the accumulation area fills, the piston will experience back pressure on its downstream end. At some point, a constant pressure differential will be established across the piston 60, and the piston 60 will move to an intermediate position within the valve 10. This intermediate position typically has the piston portion 60*b* partially covering the upstream end of outlet 40. For example, if the pressure on the distal end of the piston is set at 1000 psi and its area is two units and the proximal end of the piston has an area of one unit, then the pressure upstream must be 2000 psi and a 1000 psi pressure differential exists. The pressure loss occurs primarily across the upstream entrance to the outlet 40 which is only partially open. A back pressure is applied to the screw, as shown by arrow B, to prevent the screw from unscrewing through the material and to set the 1000 psi pressure in chamber 6. In other words, a back pressure is utilized to keep the screw in a fixed position at the end of the recover step.

Figure 7:
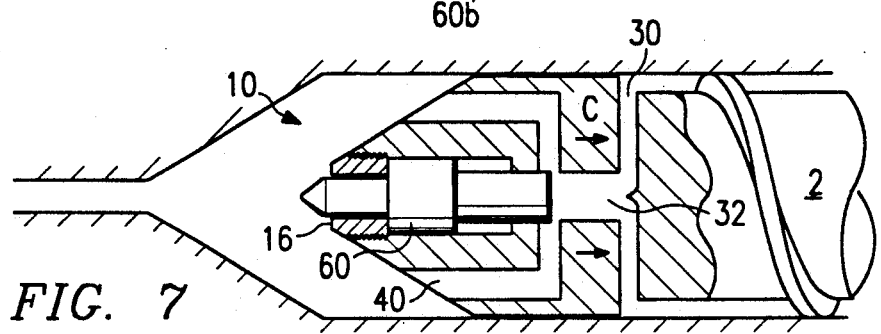

FIG. 7 illustrates "pullback" which may occur after "recovery". During pullback, the screw 2 stops its rotation, and the screw 2 and valve 10 are pulled back a small distance as indicated by arrow C. Pullback places a slight negative pressure on the downstream face of the piston and minimizes any leakage of material from the accumulation area into the mold when the mold is opened. The slight negative pressure will tend to pull the piston slightly downstream but motion is limited by cap 16.

Figure 9:
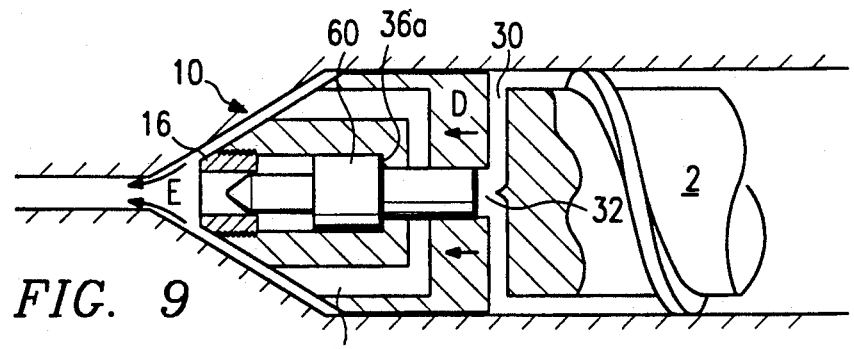

FIG. 9 illustrates the valve 10 during "injection". Once the shot of material is present in the accumulation area and the valve has pulled back, the screw and valve translate forward, as indicated by arrow D, to inject the shot into a mold. The piston will close automatically due to the high material pressure generated in the accumulation area and the area difference between the two ends of the piston. The piston is in an upstream position against flange surface 36. In other words, the piston overstrokes the material flowpath. The shot is expelled as shown by the arrows E.

Figure 8:
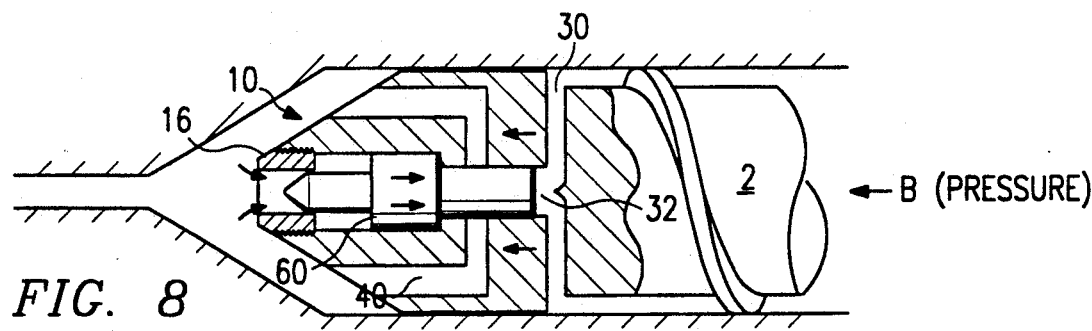

FIG. 8 illustrates the step of "preclosure" which can occur between recovery and pullback. The goal of preclosure is to close the piston 60 back over the upstream end of outlet 40 before the shot of material is injected. The piston precloses when pressure is maintained in the accumulation area without screw rotation to keep the valve open. This occurs when a back pressure is maintained on the screw as indicated by arrow B. Due to the area differential between the downstream face and upstream face of the piston 60, a force differential exists. Typically the ratio between the downstream face area to the upstream face area is between 2.0:1 and 1.5:1. This force differential precloses the piston prior to injection.

Figure 10:
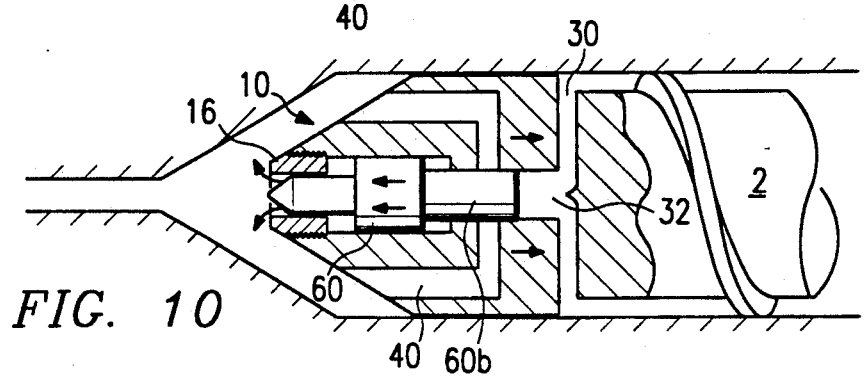

FIG. 10 illustrates the piston during the "pullback after preclose" stage of the injection method. After preclose, the screw 2 and valve 10 are pulled back in preparation for injection, in similar fashion to the step disclosed in FIG. 7. However, despite the negative pressure experienced by the downstream face of the piston, the valve remains closed due to the length of the reduced diameter piston portion 60*b* extending somewhat beyond the entrance to outlet 40 and the short duration of pullback.

FIGS. 11 and 12 illustrate alternate embodiments of the non-return valve designed to ensure that the valve In FIGS. 11 and 12 illustrate alternate embodiments of the non-return valve designed to ensure that the valve remains closed during pullback after preclose. In FIG. 11, the last portion of the opening stroke of the piston 60 is slowed by a smaller hole 16*a* in the cap or piston retainer 16. After the piston closes outlet passage(s) 16*d*, during opening, material can be rejected from the piston cavity only through hole 16*a*, thus slowing its motion. Also, valve closings at both the start of injection and preclosure will be slowed. Material can enter the piston cavity during valve closing action only through small hole 16*a* until outlet passage(s) 16*d* has been opened. In FIG. 12, a small check valve 16*b* with a small hole 16*a* and retainer pin 16*c* is added downstream of the piston to avoid this slowing of closure.

FIG. 13 illustrates a non-return valve 10 which is integral with the screw 2.

FIG. 14 illustrates a version of the valve with a ring functioning as the piston. In this version, the ring 61 has an area on its distal end larger than that on its proximal end. It is functionally identical to piston 60 even though it closes inlets 30 instead of outlets 40. Retainer pin 62 performs the same function as cap 16 performs on the piston design. The valve body is shown as an integral part of screw 2, but it can alternatively be threaded into the screw as shown in FIG. 1.

In sum, a preferred embodiment of the valve 10 fits into the same area as a prior art non-return valve. The material proceeds downstream between the screw flights due to the rotation of the screw until it encounters the valve 10. As it reaches the valve, the material enters the two inlet holes 30 on either side of the valve 10, and proceeds to the second bore 32. The material forces the piston 60 into a downstream position, exposing a portion of the upstream entrance to outlet 40. The material follows the outlet passage 40 until it discharges from the valve 10 and into accumulation area 6 which communicates with the downstream end of piston 60.

After the accumulation area 6 is filled to selected volume, the screw 2 stops its rotation. After the previously molded part is removed from the mold, the forward stroke begins and the piston 60 is moved to an upstream position blocking the material flowpath. The piston 60 can be preclosed prior to injection if back pressure is maintained on the screw for a moment after screw rotation is stopped. The force that is seen on the downstream piston surface 60d is greater than the force imparted to the smaller upstream piston surface 60a although the pressures are the same. Therefore, the piston 60 will move upstream closing off the entrance 46. As the piston moves upstream and covers the entrance to outlets 40 there is a positive shut off through the sliding and covering of this radial hole.

Although preferred embodiments of the invention have been described in the foregoing Detailed Description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications, and substitutions of parts and elements as fall within the spirit of the scope of the invention.

I claim:

1. A method of injecting material fed through a non-return valve, said non-return valve attached to a screw, said valve and screw contained within a barrel with an axis, said method comprising:
   a) recovering a volume of material in an accumulation area downstream of said valve in said barrel by rotating said screw;
   b) injecting said volume of material through a nozzle downstream of said accumulation area by translating said screw in a downstream direction, said injection closing said valve by forcing a piston within said valve with a downstream end area larger than its upstream end area to a position slidably blocking and overstroking the flowpath of material therethrough.

2. The method of injecting material of claim 1 further comprises pulling back said valve to decompress the volume of material in the accumulation area prior to step (b).

3. The method of injecting material of claim 2 further comprises preclosing said valve prior to the step of pulling back the valve.

4. The method of injecting material of claim 3 wherein said step of preclosing further comprises maintaining hydraulic back pressure on said screw for a predetermined period of time after recovering the selected volume of material, the hydraulic back pressure on the screw maintaining the pressure on the downstream of said piston with said valve.

5. The method of injecting material of claim 2 wherein said step of pulling back comprises translating said screw and attached upstream a predetermined distance.

6. The method of injecting material of claim 1 wherein said step of recovering a volume of material comprises:
   a) rotating said screw to draw and plasticize a stream of feed material through the flights of said screw;
   b) forcing said stream of material through said valve inlets;
   c) flooding a second bore area within said valve;
   d) forcing a piston slidably disposed within said valve to a downstream position partially within a first bore, thereby exposing an outlet; and
   e) forcing material through said outlet and into the accumulation area.

7. A method of injecting material through a non-return valve located in a barrel at the end of a rotatable and translatable screw, said method comprising:
   (a) recovering a volume in an accumulation area downstream of the valve in the barrel by rotating the screw;
   (b) preclosing the valve prior to pull back thereby closing and overstroking a material flowpath through said valve;
   (c) pulling back the valve and screw; and
   (d) injecting the volume through a nozzle downstream by translating the screw in a downstream direction.

8. A method of injecting material through a non-return valve located in a barrel at the end of a rotatable and translatable screw, said method comprising:
   (a) recovering a volume of material in an accumulation area downstream of the valve in the barrel by rotating the screw;
   (b) pulling back the valve and screw; and
   (c) injecting the volume through a nozzle downstream by translating the screw in a downstream direction, the injection closing the valve by forcing a piston within the valve with a downstream end area larger than its upstream end area to a position closing and overstroking a material flowpath through said valve.

9. A method of injecting material through a non-return valve located in a barrel at the end of a rotatable and translatable screw, said method comprising:
   (a) recovering volume in an accumulation area downstream of the value in the barrel by rotating the screw;
   (b) pulling back the valve and screw, and p1 (c) injecting the volume through a nozzle downstream by translating the screw in a downstream direction, the injection closing the valve by forcing a ring over the valve, said ring having a downstream end area larger than its upstream end area, to a position closing and overstroking a material flowpath through said valve.

10. A method of injecting material fed through a non-return valve, said non-return valve attached to a screw, said valve and screw contained within a barrel with an axis, said method comprising:
   a) recovering a volume of material in an accumulation area downstream of said valve in said barrel by rotating said screw;
   b) preclosing said valve;
   c) injecting said volume of material through a nozzle downstream of said accumulation area by translating said screw in a downstream direction, said injection closing said valve by forcing a piston within said valve with a downstream end area larger than its upstream end area to a position closing and overstroking a material flowpath through said valve.

11. The method of injecting material of claim 10 further comprises pulling back said valve to decompress the volume of material in the accumulation area between steps (b) and (c).

12. The method of injecting material of claim 10 wherein said step of preclosing further comprises maintaining hydraulic back pressure on said screw for a predetermined period of time after recovering the selected volume of material, the hydraulic back pressure on the screw maintaining the pressure on the downstream face of said piston within said valve.

13. The method of injecting material of claim 10 wherein said step of recovering a volume of material comprises:
   a) rotating said screw to draw and plasticize a stream of feed material through the flights of said screw;
   b) forcing said stream of material through said valve inlets;
   c) flooding a second bore area within said valve;
   d) forcing a piston slidably disposed within said valve to a downstream position, thereby exposing an outlet; and
   e) forcing material through said outlet and into the accumulation area.

14. The method of injecting material of claim 10 wherein said step of pulling back comprises translating said screw and attached valve upstream a predetermined distance.

15. A non-return valve for use at the downstream end of a screw in a barrel, said screw providing material flow by rotation and also functioning as a reciprocating ram to collect and discharge material at its downstream end, said valve comprising a movable member with a projected downstream end area larger than a projected upstream end area, and said movable member slidably closing and overstroking a material flowpath through the valve when a downstream material pressure times the downstream movable member end area exceeds an upstream material pressure times the upstream movable member end area.

16. The non-return valve of claim 15 wherein said movable member comprises a piston with a first portion and a second portion, said piston slidably engaged within a first and second bore within said valve.

17. A non-return valve for use with a screw in a barrel with an axis, said screw defining a material feed path, said non-return valve comprising:
   a) a frame slidably engaged within the barrel, said frame having a distal end and a proximal end, said proximal end attached to said screw, said frame further defining a first bore located in said frame and in fluid communication area downstream of said frame;
   b) a second bore, smaller in cross-sectioned area than said first bore, located in said frame upstream from and in contact with said first bore;
   c) at least one inlet connecting said material feed path and said second bore;
   d) at least one outlet directly connecting said second bore to the accumulation area downstream of said frame, said outlet located downstream of said inlet; and
   e) a piston within said first bore, said piston having a first portion, a second portion, an upstream face, and a downstream face, said piston dimensioned to slidably engage said first bore and said second bore, said piston having a downstream position and an upstream position, said upstream position having said second piston portion sealing said inlet passage from said outlet.

18. The non-return valve of claim 17 wherein said first bore is coaxial with said axis.

19. The non-return valve of claim 17 wherein said second bore is coaxial with said axis.

20. The non-return valve of claim 17 wherein said first bore is generally cylindrical.

21. The non-return valve of claim 17 wherein said second bore is generally cylindrical.

22. The non-return valve of claim 17 wherein said piston is substantially perpendicular to the outlet passage adjacent to said second bore.

23. The non-return valve of claim 17 wherein said at least one output passage comprises a substantially curved path or angled at less than 90° path from said second bore to said accumulation area.

24. The non-return valve of claim 17 wherein said piston is dimensioned so that it will slide to its closed position when identical pressures are applied to its upstream face as its downstream face.

25. The non-return valve of claim 17 wherein said piston travels within said frame, the limit of said travel set by a flow-through cap attached to the distal end of said frame and by stop means between the first bore and the second bore.

26. The non-return valve of claim 17 wherein said frame is integral with said screw.

27. A non-return valve for use in an injection molding apparatus which includes a screw rotatable about an axis and reciprocable along said axis to discharge material at a discharge end thereof, said non return valve comprising:
   a) a frame fitting closely but slidably within the barrel, having an upstream and a downstream end, securable to said screw and having at least one inlet from said screw into a second cylindrical bore in said frame, said frame further having a first cylindrical bore downstream from said second bore and concentric therewith, said frame also having at least one outlet directly connecting said second bore to an outer surface of said frame downstream from said inlet;
   b) a piston coaxial with said axis and having a first diameter at a downstream portion thereof, so as to be slidable in said first bore and a second diameter at an upstream portion thereof which is slidable within said second bore, said upstream portion dimensioned to seal said outlet from said inlet when said piston is displaced in an upstream direction; and
   c) a retaining means secured in said second bore at its downstream end to prevent displacement of said piston in a downstream direction past a predetermined point.

28. The non-return valve of claim 27 wherein said first bore is concentric with said axis.

29. The non-return valve of claim 27 wherein said diameter is less than said first diameter.

30. The non-return valve of claim 27 wherein said retaining means includes an annular male threaded member threaded into a corresponding female threaded portion formed at a downstream end of said first bore.

31. The non-return valve of claim 27 wherein said inlet and said outlet are axially spaced.

32. The non-return valve of claim 27 wherein said frame is integral with said screw.

33. A non-return valve for use in an injection molding apparatus which includes a screw rotatable about an axis and reciprocable along same to discharge material through a non-return valve at a discharge end of said screw, said non-return valve comprising:
   a) a cylindrical frame fitting closely but slidably within said barrel and secured to said screw, having one or more inlets in communication between a helical channel of said screw and a cylindrical second bore in said frame, said second bore being concentric with said axis, said frame further having a cylindrical first bore immediately downstream from said second bore and concentric therewith, said first bore having a diameter which is larger than the diameter of said second bore, said valve also having one or more outlets connecting said second bore to an outer surface of said valve, said outlets being located downstream from said inlets;

b) a piston having a first diameter at a downstream portion thereof which is slightly less than said diameter of said first bore so as to be slidable therein, and a second diameter at an upstream portion thereof which is slightly less than said diameter of said second bore so as to be slidable therein, said upstream portion being able to seal said outlets from communicating with said inlets when said piston is displaced in an upstream direction, said piston being responsive to pressure from said material at said discharge end of said screw and said valve whereby said piston is forced in an upstream direction sealing said outlets when the force on the downstream end of the piston exceeds the force on the upstream end of the piston; and (c) a removable retaining means to secure the piston in the bores.

34. A non-return valve comprising:
(a) a frame slidable within a barrel and attached to a screw defining a screw feed path;
(b) a first bore in the frame in fluid communication with an accumulation area;
(c) a second bore in the frame which is smaller than the first bore, said second bore located and connected upstream to the first bore;
(d) an inlet connecting the screw feed path to the second bore;
(e) an outlet connecting the second bore to the accumulation area;
(f) a piston slidable engaged within the first bore and second bore, said piston having a downstream projected area greater than an upstream projected area; and
(g) the piston having an upstream portion sealing the outlet passage from the inlet.

35. A non-return valve comprising:
(a) a frame slidable within a barrel and secured to a screw, the frame having an inlet from the screw to a second bore,
(b) a first bore in the frame downstream and concentric with the second bore;
(c) an outlet from the second bore to a downstream outer surface of the frame;
(d) a piston having a first diameter at downstream portion slidable in the first bore and a second diameter at an upstream portion slidable within the second bore, the upstream portion displaceable upstream to slidably overstroke the outlet, said piston having a downstream projected area greater than an upstream projected area; and
(e) a retaining means secured in the first bore to prevent displacement of the piston in a downstream direction past a predetermined point, and the retaining means including an annular male threaded member threaded into a corresponding female threaded portion formed at a downstream end of the first bore.

36. A non-return valve comprising:
(a) a frame with a first external diameter and a second external diameter;
(b) an external piston with an internal diameter, an external diameter, a downstream projected area, and an upstream projected area, wherein the downstream projected area is larger than the upstream projected area, wherein the downstream projected area is larger than the upstream projected area;
(c) a material flowpath with an inlet and an outlet, wherein said external piston is slidable around said frame between a piston forward of said inlet and a position overstroking said inlet; and
(d) a retainer pin attached to said frame to limit the forward motion of the piston.

* * * * *

UNITED STATES PATENT AND TRADEMARK OFFICE
CERTIFICATE OF CORRECTION

PATENT NO. : 5,258,158
DATED : November 2, 1993
INVENTOR(S) : Robert F. Dray

It is certified that error appears in the above-indentified patent and that said Letters Patent is hereby corrected as shown below:

Col. 4, line 2, insert --the-- after "when".
Col. 7, line 56, insert --face-- after "stream".
Col. 7, line 59, insert --valve-- after "attached".
Col. 8, line 39, delete "P1 (c) in" and col. 8, line 40 delete "jecting" and insert therefor --(c) injecting--; as the beginning of another paragraph.
Col. 10, line 52, insert --second--after "said".

Signed and Sealed this

Fifteenth Day of March, 1994

Attest:

BRUCE LEHMAN

Attesting Officer

Commissioner of Patents and Trademarks